US012664081B2

(12) United States Patent
Kachare et al.

(10) Patent No.: US 12,664,081 B2
(45) Date of Patent: Jun. 23, 2026

(54) SYSTEMS AND METHODS FOR SERVICING MEMORY ACCESS REQUESTS

(71) Applicant: Samsung Electronics Co., Ltd.,
Suwon-si (KR)

(72) Inventors: Ramdas P. Kachare, Pleasanton, CA
(US); Amir Beygi, San Jose, CA (US);
Mohammadreza Soltaniyeh,
Sunnyvale, CA (US); Dongwan Zhao,
San Jose, CA (US)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 8 days.

(21) Appl. No.: 18/630,731

(22) Filed: Apr. 9, 2024

(65) Prior Publication Data

US 2025/0238360 A1     Jul. 24, 2025

Related U.S. Application Data

(60) Provisional application No. 63/623,627, filed on Jan.
22, 2024, provisional application No. 63/531,310,
filed on Aug. 7, 2023.

(51) Int. Cl.
*G06F 12/02*          (2006.01)
(52) U.S. Cl.
CPC ................................ *G06F 12/0238* (2013.01)
(58) Field of Classification Search
CPC .................................................. G06F 12/0238
See application file for complete search history.

(56) References Cited

U.S. PATENT DOCUMENTS

| | | | |
|---|---|---|---|
| 8,589,655 | B2 | 11/2013 | Colgrove et al. |
| 8,954,654 | B2 | 2/2015 | Yu et al. |
| 10,466,906 | B2 | 11/2019 | Benisty |

(Continued)

FOREIGN PATENT DOCUMENTS

WO     WO 2022/164490 A1     8/2022

OTHER PUBLICATIONS

Oe, Kazuichi, et al., "Automated tired storage system consisting of
memory and flash storage to improve response time with input-
output (IO) concentration workloads," 2017 Fifth International
Symposium on Computing and Networking (CANDAR), Aomori,
Japan, pp. 311-317.

(Continued)

*Primary Examiner* — Michael Krofcheck
(74) *Attorney, Agent, or Firm* — Womble Bond Dickinson
(US) LLP

(57)          ABSTRACT
Systems and methods for managing memory devices are
disclosed. A device may include a controller, a first non-
volatile memory (NVM) device, and a second NVM device.
The controller may be configured to: detect a first condition;
set, based on the first condition, the first NVM device for
operating in a first operation mode and the second NVM
device for operating in a second operation mode; receive a
request from a computing device; and select one of the first
NVM device or the second NVM device based on the
request being respectively one of a first type or a second
type, wherein the first NVM device is configured take a first
action according to the first operation mode, and the second
NVM device is configured take a second action according to
the second operation mode.

14 Claims, 7 Drawing Sheets

(56)            References Cited

U.S. PATENT DOCUMENTS

| | | | |
|---|---|---|---|
| 11,016,890 B2 | 5/2021 | Stonelake et al. | |
| 11,429,544 B2 | 8/2022 | Steinmetz et al. | |
| 2008/0291727 A1* | 11/2008 | Seo | G06F 13/1694 |
| | | | 365/185.08 |
| 2010/0202238 A1* | 8/2010 | Moshayedi | G06F 11/1666 |
| | | | 714/E11.12 |
| 2015/0055406 A1* | 2/2015 | Andre | G06F 12/0804 |
| | | | 365/158 |
| 2018/0090501 A1* | 3/2018 | Yamakoshi | G11C 11/4096 |
| 2019/0004724 A1* | 1/2019 | Kanno | G06F 3/0631 |
| 2019/0042150 A1* | 2/2019 | Wells | G06F 3/0611 |
| 2021/0373951 A1* | 12/2021 | Malladi | G06F 12/0868 |
| 2022/0164135 A1* | 5/2022 | Tebbutt | G06F 3/0679 |
| 2022/0291838 A1 | 9/2022 | Gorobets et al. | |
| 2022/0300193 A1 | 9/2022 | Gao et al. | |
| 2023/0116254 A1 | 4/2023 | Benisty | |
| 2023/0153027 A1 | 5/2023 | Hahn et al. | |
| 2023/0273731 A1 | 8/2023 | Ki et al. | |
| 2023/0315642 A1* | 10/2023 | Polishuk | G06F 12/0888 |
| | | | 711/118 |

OTHER PUBLICATIONS

Zheng, Huihuo, et al., "HDF5 Cache vol. Efficient and Scalable Parallel I/O through Caching Data on Node-local Storage," 2022 22nd IEEE International Symposium on Cluster, Cloud and Internet Computing (CCGrid), Taormina, Italy, pp. 61-70.

\* cited by examiner

SYSTEMS AND METHODS FOR SERVICING MEMORY ACCESS REQUESTS

CROSS-REFERENCE TO RELATED APPLICATION(S)

The present application claims priority to and the benefit of U.S. Provisional Application No. 63/623,627, filed Jan. 22, 2024, entitled "METHOD FOR LATENCY REDUCTION IN COMPUTE EXPRESS LINK (CXL) BASED TIERED MEMORY USING DUAL BACK-END SSDS," and claims priority to and the benefit of U.S. Provisional Application No. 63/531,310, filed Aug. 7, 2023, entitled "METHOD FOR LATENCY REDUCTION IN CXL BASED TIERED MEMORY USING DUAL BACK-END SSDS" the entire content of each of which is incorporated herein by reference.

FIELD

One or more aspects of embodiments according to the present disclosure relate to memory devices, and more particularly to systems and methods for managing the memory devices.

BACKGROUND

An application running on a host computing device may need to read and write data to memory. As the amount data read and written to memory increases, the demand for storage devices and memory, and efficiently accessing the storage devices and memory, may also increase.

The above information disclosed in this Background section is only for enhancement of understanding of the background of the present disclosure, and therefore, it may contain information that does not form prior art.

SUMMARY

Embodiments of the present disclosure are directed to a device comprising a controller, a first non-volatile memory (NVM) device, and a second NVM device. The controller is configured to: detect a first condition; set, based on the first condition, the first NVM device for operating in a first operation mode and the second NVM device for operating in a second operation mode; receive a request from a computing device; and select one of the first NVM device or the second NVM device based on the request being respectively one of a first type or a second type, wherein the first NVM device is configured take a first action according to the first operation mode, and the second NVM device is configured take a second action according to the second operation mode.

In some embodiments, the first condition includes at least one of expiration of a time period, loss of power, or a command from the computing device.

In some embodiments, the first type includes a write request and the second type includes a read request.

In some embodiments, the device further comprises a first memory device and a second memory device, and the controller is further configured to: determine that the request is for writing first data; and based on the request: identify second data in the first memory device; determine that the first NVM device is set to a write operation mode; write second data to the second memory device and to the first NVM device; and store the first data in the first memory device.

In some embodiments, the controller is further configured to: receive a second request to read the first data; and based on the second request: generate a first command to retrieve the first data from the first memory device and detect a first result; based on the first result, generate a second command to retrieve the first data from the second memory device and detect a second result; determine that the second NVM device is set to a read operation mode; and based on the second result, generate a command to the second NVM device to retrieve the first data.

In some embodiments, the controller is further configured to: detect a second condition; based on detecting the second condition, the controller is further configured to: determine that the second NVM device is set to a read operation mode; based on the second NVM device being set to the read operation mode, store the second data in the second memory device to the second NVM device; and set the first NVM device to the read operation mode and the second NVM device to the write operation mode.

In some embodiments, the device further comprises a memory device, wherein the controller is further configured to: detect a second condition; based on detecting the second condition, the controller is further configured to: set the first NVM device and the second NVM device to operate in the first operation mode.

In some embodiments, the second condition includes loss of power to the device, and the first operation mode includes a write mode, wherein the controller is further configured to: read first data and second data stored in the memory device; and store the first data into the first NVM device and the second data into the second NVM device.

In some embodiments, the second condition includes detecting power to the device, and the first operation mode includes a read mode, wherein the controller is further configured to: identify first data in the first NVM device and second data in the second NVM device; read the first data and the second data from respectively the first NVM device and the second NVM device; and store the first data and the second data in the memory device.

In some embodiments, wherein the controller being configured to set the first NVM device for operating in a first operation mode and the second NVM device for operating in a second operation mode further includes the controller being configured to: set in a memory a first value for the first NVM device for identifying the first operation mode, and a second value for the second NVM device for identifying the second operation mode.

One or more embodiments of the present disclosure are also directed to a method comprising: detecting, by a controller of a storage device, a first condition; setting, by the controller, based on the first condition, a first non-volatile memory (NVM) device for operating in a first operation mode and a second NVM device for operating in a second operation mode; receiving, by the controller, a request from a computing device; and selecting one of the first NVM device or the second NVM device based on the request being respectively one of a first type or a second type, wherein the first NVM device is configured take a first action according to the first operation mode, and the second NVM device is configured take a second action according to the second operation mode.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
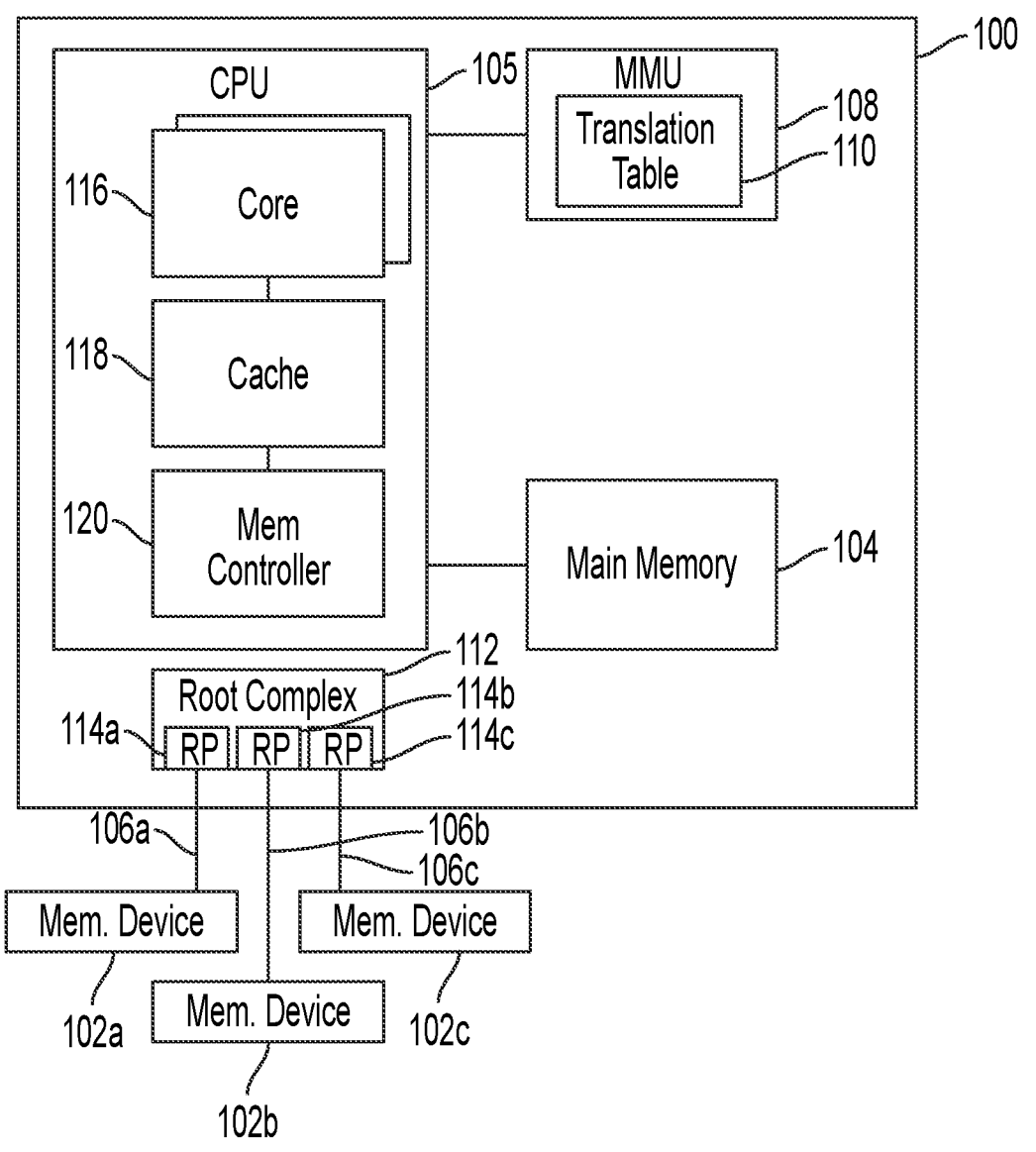
FIG. 1 depicts a block diagram of a computing system according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

Applications generally require fast, stable, and predictable storage. As the amount of data processed by the applications increases, the demand for rapid data retrieval and storage may also increase. Certain types of memory such as dynamic random access memory (DRAM) may deliver appropriate speed, but their high cost may reduce their use as the sole storage device in a computing system.

Other types of storage media such as solid state drives (SSDs) offer a compromise between speed and affordability. However, the performance of SSDs can vary significantly based on the type of workload. For example, SSDs might excel at quickly reading and delivering small files, but their performance may falter in mixed traffic scenarios that require processing of intensive read and write operations. The unpredictable performance may create challenges for applications that rely on consistent data access latency. This challenge may become even more pronounced when SSDs are used as memory tiering devices, particularly when accessed over a high-speed interface like Compute Express Link (CXL). Thus, it may be desirable to have a storage solution that provides a balance between affordability, speed, and reliability as applications continue to evolve in complexity and demand.

In general terms, embodiments of the present disclosure are directed to a storage device that uses multiple types of storage for providing memory tiering. In some embodiments, the storage device includes a mix of volatile memory (e.g., DRAM), and two or more non-volatile memories (NVMs) (e.g., SSDs). Read and write requests to the NVMs may be separated by having the read requests be directed to a first NVM, and the write requests be directed to a second, different NVM. The read requests may be serviced by the first NVM with predictable read-only throughput latency. Because the write requests are serviced by a different NVM, no additional latency may be added to the processing of the read request that may otherwise be added when the same NVM services both read and write traffic. Thus, applications may be able to access data from the storage device with predictable performance even in mixed traffic scenarios.

FIG. 1 depicts a block diagram of a computing system according to one or more embodiments. The system includes a host computing device (referred to as the "host") 100 coupled to a one or more endpoints such as, for example, one or more memory devices 102*a*-102*c* (collectively referenced as 102).

The host 100 includes, without limitation, a processor 105, main memory 104, memory management unit (MMU 108), and root complex (RC) interface 112. The processor 105 may include one or more central processing unit (CPU) cores 116 configured to execute computer program instructions and process data stored in a cache memory (simply referred to as "memory" or "cache") 118. The cache 118 may be dedicated to one of the CPU cores 116 or shared by various ones of the CPU cores. It should be appreciated that although a CPU is used to describe the various embodiments, a person of skill in the art will recognize that a GPU or other computing unit may be used in lieu or in addition to a CPU.

The cache 118 may be coupled to a memory controller 120 which in turn is coupled to the main memory 104. The main memory 104 may include, for example, a dynamic random access memory (DRAM) storing computer program instructions and/or other types of data (collectively referenced as data) provided by the memory device 102. In order for a CPU core 116 to execute instructions or retrieve data provided by the memory device 102, the corresponding data may be loaded into the cache memory 118, and the CPU core may consume the data (e.g., directly) from the cache memory. If the data to be consumed is not already in the cache, a cache miss may occur, and the memory device 102 may need to be queried to load the data. For example, if the data to be consumed is not in the cache 118, a cache miss logic may query the data from memory (e.g., main memory (e.g., DRAM) 104 or memory device 102) based on a mapped virtual or physical address.

In some embodiments, the processor 105 (e.g., an application running on the processor) generates data access requests for the memory devices 102. One or more of the data access requests may include a virtual memory address of a location to write or read data. The processor 105 may invoke the MMU 108 to translate the virtual address to a physical address for processing the request. The MMU 108 may include a translation table 110 that maps virtual addresses to physical addresses. The request transmitted to the memory device 102 for fulfilling the data access request may include the physical address corresponding to the virtual address.

In some embodiments, the host 100 exchanges signals or messages with the memory devices 102 via the RC interface 112 and interface connections 106a-106c (collectively referenced as 106). For example, the host 100 may transmit a request (e.g., a load or store request) over the RC interface 112 and interface connections 106 for reading or writing data from or to the memory devices 102. Messages from the memory devices 102 to the host 100, such as, for example, responses to the requests from the host, may be delivered over the interface connections 106 to the RC interface 112, which in turn delivers the responses to the processor 105. The host 100 and the memory devices 102 may further exchange signals including, for example, certain types of notifications or configuration commands, over the RC interface 112 and interface connections 106.

In some embodiments, the interface connections 106 (e.g., the connector and the protocol thereof) include a memory expansion bus such as, for example, a Compute Express Link (CXL), although embodiments are not limited thereto. For example, the interface connections 106 (e.g., the connector and the protocol thereof) may also include a general-purpose interface such as, for example, Ethernet, Universal Serial Bus (USB), and/or the like. In some embodiments, the interface connections 106 may include (or may conform to) a Cache Coherent Interconnect for Accelerators (CCIX), dual in-line memory module (DIMM) interface, Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), iWARP protocol, InfiniBand protocol, 5G wireless protocol, Wi-Fi protocol, Bluetooth protocol, and/or the like.

The RC interface 112 may be, for example, a PCIe interface configured to implement a root complex for connecting the processor 105 and main memory 104 to the memory devices 102. The RC interface 112 may include one or more ports 114a-114c to connect the one or more memory devices 102 to the RC. In some embodiments, the MMU 108 and/or translation table 110 may be integrated into the RC

112 interface for allowing the address translations to be implemented by the RC interface.

The memory device 102 may include one or more of a volatile computer-readable storage medium and/or non-volatile computer-readable storage medium. In some embodiments, one or more of the memory devices 102 include memory that is attached to a CPU or GPU, such as, for example, a CXL attached memory device (including volatile and persistent memory device), RDMA attached memory device, and/or the like, although embodiments are not limited thereto. The CXL attached memory device (simply referred to as CXL memory) may adhere to a CXL.mem protocol where the host 100 may access the memory using commands such as load and store commands. In this regard, the host 100 may act as a requester and the CXL memory may act as a subordinate.

In some embodiments, the memory devices 102 are included in a memory system that allows memory tiering to deliver an appropriate cost or performance profile. In this regard, the different types of storage media may be organized in a memory hierarchy or tier based on a characteristic of the storage media. The characteristic may be access latency. In some embodiments, the tier or level of a memory device increases as the access latency decreases.

In some embodiments, the one or more of the memory devices 102 are memory devices of the same or different type, that are aggregated into a storage pool. For example, the storage pool may include one or more CPU or GPU attached memory devices.

Figure 2:
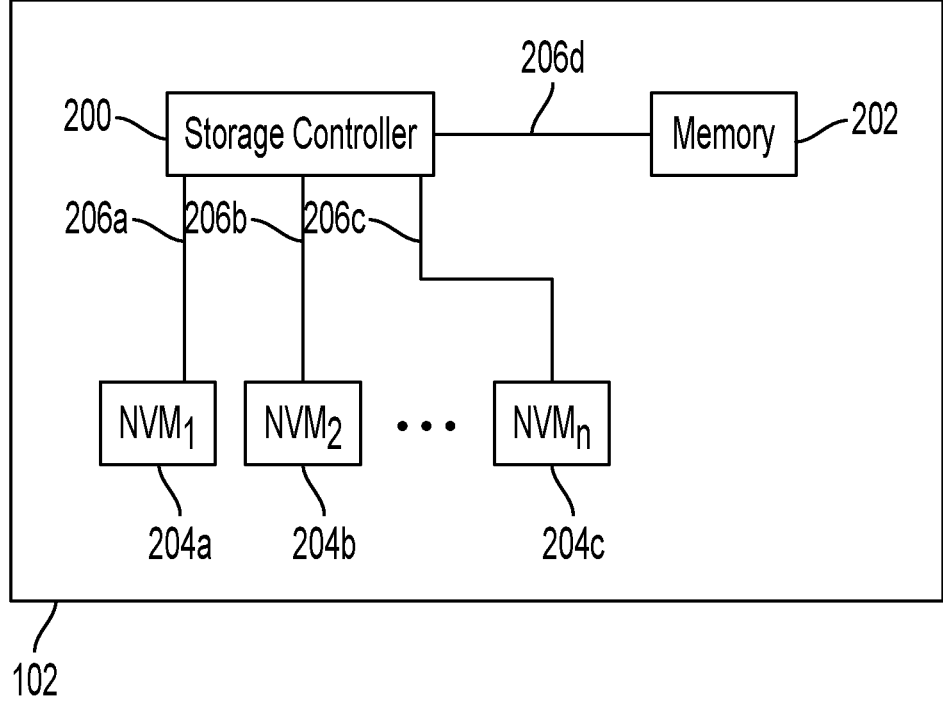
FIG. 2 depicts a block diagram of a memory device according to one or more embodiments.

FIG. 2 depicts a block diagram of a memory device 102 according to one or more embodiments. In some embodiments, the memory device 102 includes a storage controller 200, storage memory 202, and two or more non-volatile memories (NVMs) 204a-204c (collectively referenced as 204). The storage memory 202 may be high-performing memory of the memory device 102, and may include (or may be) volatile memory, for example, such as DRAM, but the present disclosure is not limited thereto, and the storage memory 202 may be any suitable kind of high-performing volatile or non-volatile memory such as, for example, random access memory (RAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like.

In some embodiments, the storage memory 202 is used and managed as cache memory. In this regard, the storage memory 202 may store copies of at least some of the data stored in the NVMs 204. In some embodiments, the storage memory 202 has a lower access latency than the NVMs 204. Thus, in some embodiments, accessing data from the storage memory 202 helps improve overall system performance and responsiveness.

The NVMs 204 may persistently store data received, for example, from the host 100. The NVMs 204 may take the form of, for example, SSDs, but the present disclosure is not limited thereto, and the NVMs 204 may include any suitable kind of memory for persistently storing the data such as, for example, floppy disks, flexible disks, hard disks, solid state cards (SSCs), solid state components (SSMs), enterprise flash drives, magnetic tapes, or any other non-transitory magnetic media, and/or the like. In some embodiments, one or more of the NVMs 204 may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like.

The storage controller 200 may be connected to the NVMs 204 and the storage memory 202 over one or more storage interfaces 206a-206d. The storage controller 200 may receive memory access requests (e.g. load or store requests) from the host 100, and transmit appropriate commands to and from the NVM 204 and/or storage memory 202 for fulfilling or servicing the 1/O requests. In this regard, the storage controller 200 may include at least one processing component embedded thereon for interfacing with the host 100, the storage memory 202, and the NVMs 204. The processing component may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the storage memory 202 or NVMs 204 according to the data access instructions.

In some embodiments, the NVMs 204 are configured to operate according to an operation mode to which the NVMs are set. The operation mode may be one of a read mode or a write mode. For example, if an NVM 204 (hereinafter referred to as the "read NVM") is set to operate in the read operation mode, the NVM may service (e.g., only service) read requests. If an NVM 204 (hereinafter referred to as the "write NVM") is set to operate in the write operation mode, the NVM may service (e.g., only service) write requests. In this manner, a given NVM may service either read requests or write requests (but not both), at a given time, avoiding read/write conflicts in the given NVM. The NVMs 204 may alternative between read and write operation modes based on a predefined policy.

Figure 3:
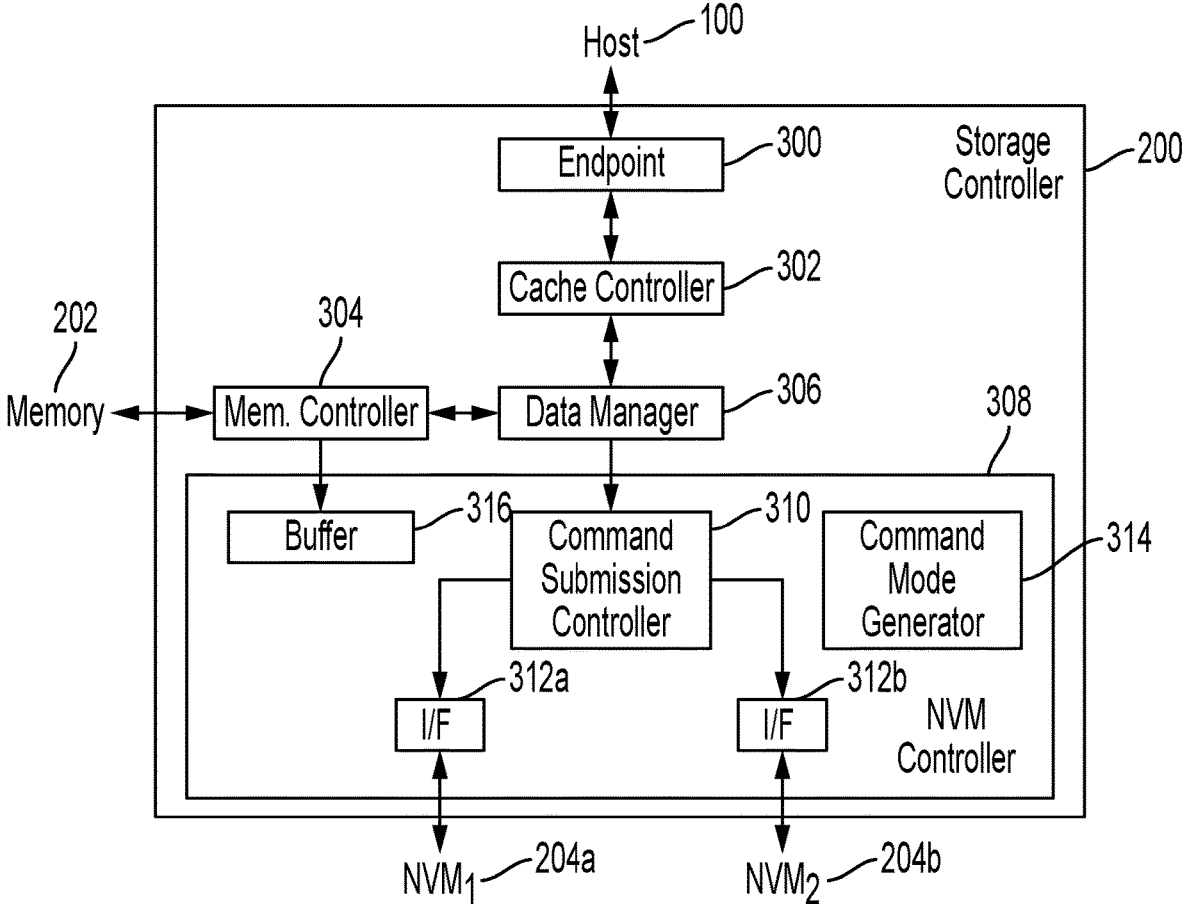
FIG. 3 depicts a block diagram of a storage controller according to one or more embodiments.

FIG. 3 depicts a block diagram of the storage controller 200 according to one or more embodiments. In some embodiments, the storage controller 200 includes a communication endpoint 300 for interfacing with the host 100. The communication endpoint 300 may include physical connections and an associated protocol (e.g., CXL) that allows the storage device 102 to exchange data with the host 100.

In some embodiments, the storage controller 200 also includes a device cache controller 302, memory controller 304, data manager 306, and NVM controller 308. Although the various controllers 302, 304, 308 and data manager 306 (collectively referred to as control components) are assumed to be separate functional units, a person of skill in the art will recognize that the functionality of the control components may be combined or integrated into a single component, or further subdivided into further sub-components without departing from the spirit and scope of the inventive concept.

In some embodiments, the device cache controller 302 is aware of the cache architecture utilized by the storage memory 202, and may use the information for managing the storing and eviction of data in and out of the memory. For example, the device cache controller 302 may process a memory access request received from the host 100 via the communication endpoint 300, and generate a cache address for a requested physical address. The device cache controller 302 may further determine whether the request results in a cache hit or miss. In addition, the device cache controller 302 may monitor the fullness of the storage memory 202 and identify and evict entries from the memory according to a configured cache algorithm (e.g., a cache replacement policy) if the storage memory 202 has reached a threshold fullness level.

In some embodiments, the device cache controller 302 passes relevant data to the data manager 306 for servicing the memory access command from the storage memory 202 or the NVM 204. For example, in the event that data requested by the host 100 is found in the storage memory 202 (e.g., a cache hit), the device cache controller 302 may pass the cache address to the data manager 306 for accessing the data form the storage memory 202. In some embodiments, the data manager 306 may communicate with the memory controller 304 for retrieving the data from the cache address.

In the event that the data requested by the host 100 is not located in the storage memory 202 (e.g., a cache miss), the device cache controller 302 may pass to the data manager 306 the address of the NVM 204 from where the data is to be retrieved. In some embodiments, the data manager 306 communicates with the NVM controller 308 to read the requested data from the NVM 204.

In some embodiments, the device cache controller 302 identifies entries in the storage memory 202 that are to be evicted to the NVM 204. Data eviction may be performed when the storage memory 202 has reached a threshold fullness level, and data identified in a store request from the host 100 cannot be saved into the storage memory 202. In this case, the device cache controller 302 may pass the cache address of the data to be evicted to the data manager 306. The data manager 306 may communicate with the NVM controller 308 to write the evicted data to the NVM 204. Depending on the write policy employed by the device cache controller 302 (e.g., write through policy, write back policy, etc.), the data manager 306 may or may not generate an additional write request to the NVM controller 308 to write the data identified by the data store request.

In some embodiments, the NVM controller 308 interfaces with the NVMs 204 according to a storage access protocol such as, for example, a non-volatile memory express (NVMe) protocol, although embodiments are not limited thereto. In this regard, the NVM controller 308 may include a command submission controller 310, a first interface 312a for the first NVM 204a, and a second interface 312b for the second NVM 204b. Of course, the NVM controller 308 may include additional interfaces if the memory device 102 includes additional NVMs.

In some embodiments, the command submission controller 310 is configured to generate read and write commands (e.g., NVMe read and write commands) based on information provided by the data manager 306. For example, a generated read command may include the address of the NVM 204 that is to be retrieved, and the address in the storage memory 202 where the retrieved data is to be returned. A generated write command may include the address of the NVM 204 where to write data, and the address of the storage memory 202 that stores the data that is to be written.

The command submission controller 310 may provide the read and write commands to the appropriate interface 312a, 312b (collectively referenced as 312) based on the operation mode of the NVM 204. For example, the command submission controller 310 may provide a read command to the first interface 312a for the first NVM 204a upon detecting that the first NVM 204a is set as a read NVM, and provide a write command to the second interface 312b for the second NVM 204b upon detecting that the second NVM 204b is set as a write NVM.

In some embodiments, the interfaces 312 include one or more queues including, for example, submission queues, completion queues, and/or the like. In the example where the first NVM 204a is set as a read NVM, the command submission controller 310 may place the read command in the submission queue of the first interface 312a. The first NVM 204a may retrieve the read command from the submission queue and service the read command by retrieving the requested data from the identified memory location of the first NVM 204a, and by storing the retrieved data in the identified memory location of the storage memory 202.

In the example where the second NVM 204b is set as a write NVM, the command submission controller 310 may place the write command in the submission queue of the second interface 312b. The second NVM 204b may retrieve the write command from the submission queue, and service the write command by retrieving the requested data from the identified memory location of the storage memory 202, and writing the data into the identified memory location of the second NVM 204b.

In some embodiments the storage controller 200 includes a buffer 316 for temporarily storing data that has not yet been committed to the read NVM (e.g., NVM 204a). In this regard, the data identified in a write request is written to both the buffer 316 and the write NVM (e.g., NVM 204b). When a change of operation mode is detected for the read NVM (e.g., a transition from read NVM to write NVM), all or a portion of the data stored in the buffer 316 is stored to the read NVM. That is, the buffer 316 may be flushed to a set level. In this manner both NVMs may store at least some of the same data and service read requests for the data when the NVMs are in the read operation mode.

In some embodiments the data stored in the buffer 316 is marked to indicate whether the data is written to one NVM or both. When the data is written to both NVMs, the memory location storing the data may be freed for making room for new data.

In some embodiments, host read requests are serviced from the buffer 316 if the requested data is temporarily stored in the buffer. If the buffer does not contain the requested data, the request may be serviced from the read NVM.

In some embodiments, the operation mode of the NVMs 204 is set by the command mode generator 314. The command mode generator 314 may use one or more policies to set the operation modes. One policy may be a time-based policy. Under the time-based policy, the command mode generator 314 may initially set one or more NVMs to a read operation mode, and one or more other NVMs to a write operation mode. In some embodiments, all NVMs are set to one operation mode. For example, all NVMs may be set to the read operation mode upon power on. In some embodiments, the NVMs alternate between the read and write operation modes at given time intervals. For example, the read NVMs (e.g., NVM 204a) may switch to the write operation mode, and the write NVMs (e.g., NVM 204b) may switch to the read operation mode, every 100 ms.

In some embodiments, the policy may use a status of the storage device 102 to trigger the transition of the storage device 102 from one operation mode to another. For example, the fullness of the buffer 316 may trigger the switch to allow the flushing of the buffer into a read NVM. In this regard, the policy may set the threshold fullness of the buffer 316 that is to be met before the switch is triggered.

In some embodiments, the status of the storage device 102 may be loss (or anticipated loss) of power or the restoring of power to the storage device 102. For example, in a persistent memory operation, the policy may trigger all of some of the NVMs 204 to be set in the write operation mode in response to determining a loss or an anticipated loss of power. The multiple NVMs 204 in the write operation mode may allow data stored in the storage memory 202 to be moved to the NVMs at increased write bandwidth before actual loss of power. When power is restored to the storage device 102, the policy may trigger all or some of the NVMs 204 to be set in the read operation mode. The multiple NVMs 204 in the read operation mode may allow the storage memory 202 to be populated at increased read bandwidth.

In some embodiments, the switching of the operation mode of the NVMs 204 is controlled or suggested by the host 100. In this regard, the host may store a policy for determining when a switch should occur. For example, the policy may be based on a status of an application issuing read and write requests to the storage device 102, the number of NVMs 204, and the like. The policy may indicate a threshold ratio of read requests to write requests that may cause the switch of the operating mode of one or more NVMs 204 from the write operation mode to the read operation mode, or vice versa. As an example, the policy may state that if read traffic is twice as many as the write traffic, the operation mode of one or more NVMs 204 should be switched from a write operation mode to a read operation mode to increase the read bandwidth. The host 100 may transmit a command to the memory device 102 with the recommended operation modes. In some embodiments, the command mode generator 308 implements the recommended operation modes if, for example, there are no conflicts with local policies.

Figure 4:
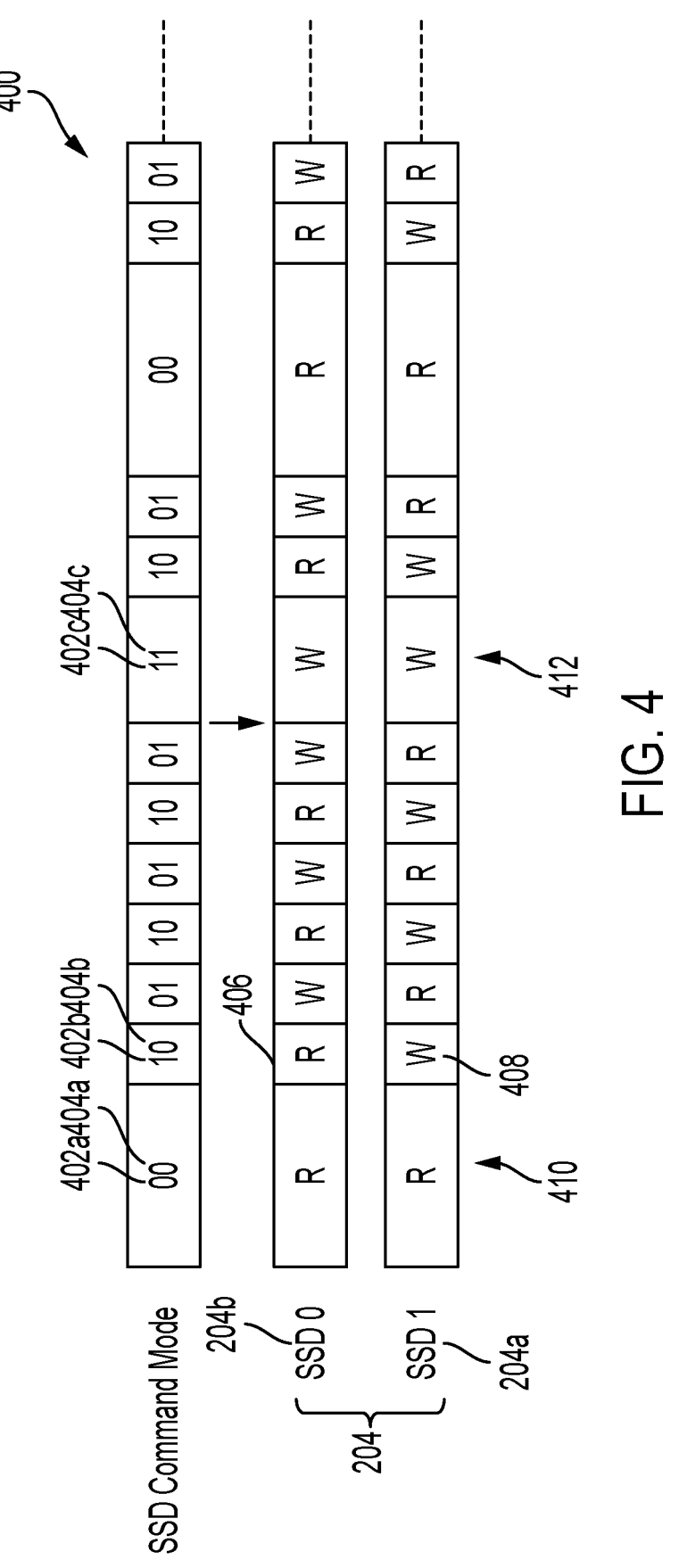
FIG. 4 depicts a layout diagram of example operation bits stored by a command mode generator according to one or more embodiments.

FIG. 4 depicts a layout diagram of example operation bits 400 stored by the command mode generator 314 according to one or more embodiments. The command mode generator 314 may set the operation bits 400 to determine the operation mode of the NVMs 204. In the example of FIG. 4, a first bit 402a-c is set for the first NVM 204a, and a second bit 404a-c is set for the second NVM 204b. For example, a bit value of "0" may indicate that the NVM is to be in the read mode 406, and a bit value of "1" may indicate that the NVM is to be in the write mode 408. The NVMs 204 may alternate operation modes periodically (e.g., on regular or irregular basis). In some embodiments, both NVMs 204 may be set to operate in the same operation mode (e.g., both in the read mode 410 or both in the write mode 412, as indicated by the associated operation bits 402a, 404a, and 402c, 404c.

Figure 5:
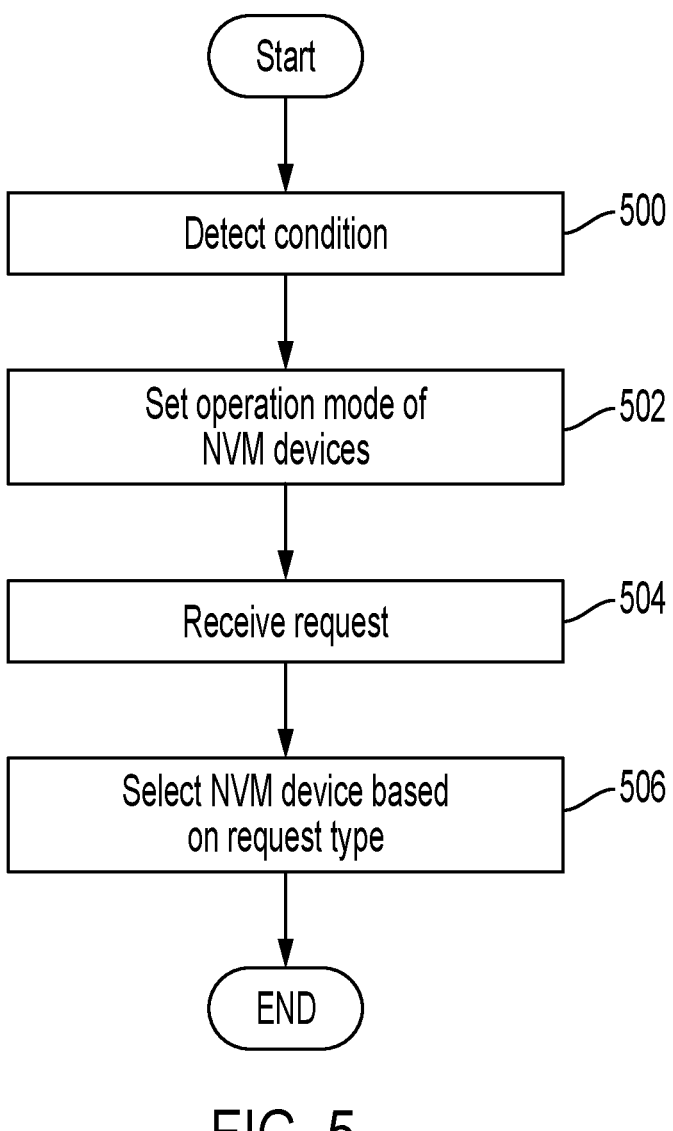
FIG. 5 depicts a flow diagram of a process for controlling operation modes of non-volatile memories (NVMs) and processing host memory access requests based on operation modes of the NVMs according to one or more embodiments.

FIG. 5 depicts a flow diagram of a process for controlling the operation modes of the NVMs and processing host memory access requests based on the operation modes according to one or more embodiments. The process starts, and in act 500, the storage controller 200 (e.g., the command mode generator 314) detects a first condition for setting or switching (collectively referenced as setting) the operation mode of one or more NVMs 204. The first condition may be identified in a policy followed by the command mode generator 314 to set the operation modes. The first condition may be, for example, expiration of a time period, detection of a threshold fullness of the buffer 316, loss of power, restoring of power, a command from the host, and/or the like.

In act 502, the operation mode of one or more NVM devices 204 is set based on the detected first condition. For example, the command mode generator 314 may set one or more operation bits 400 of a first NVM device and of a second NVM device based on the detected condition. In this regard, a first NVM device may be set to a first operation mode, and a second NVM device may be set to a second operation mode. The operation mode of an NVM device may change based on detecting a second condition.

In act 504, the storage controller 200 receives a memory access request from a computing device (e.g., the host 100). The memory access request may be a request to read or write data.

In the event that the device cache controller 302 determines that access of the NVM 204 is needed to service the request (e.g., in the event of a cache miss), the data manager 306 transmits a read or write command to the NVM controller 308. The NVM controller 308 selects, in act 506, one of the first NVM device or the second NVM device to service the memory access command from the host 100. In this regard, the command submission controller 310 may identify the operation mode of the first NVM device based on the operation mode set by the command mode generator 314, and select the first NVM device based on the memory access request being of a first type (e.g., write request). The first NVM device may be configured to respond to the memory access request according to the first operation mode.

The command submission controller 310 may also identify the operation mode of the second NVM device based on the operation mode set by the command mode generator 314, and select the second NVM device based on the memory access request being of a second type (e.g., read request). The second NVM device may be configured to respond to the memory access request according to the second operation mode.

Figure 6:
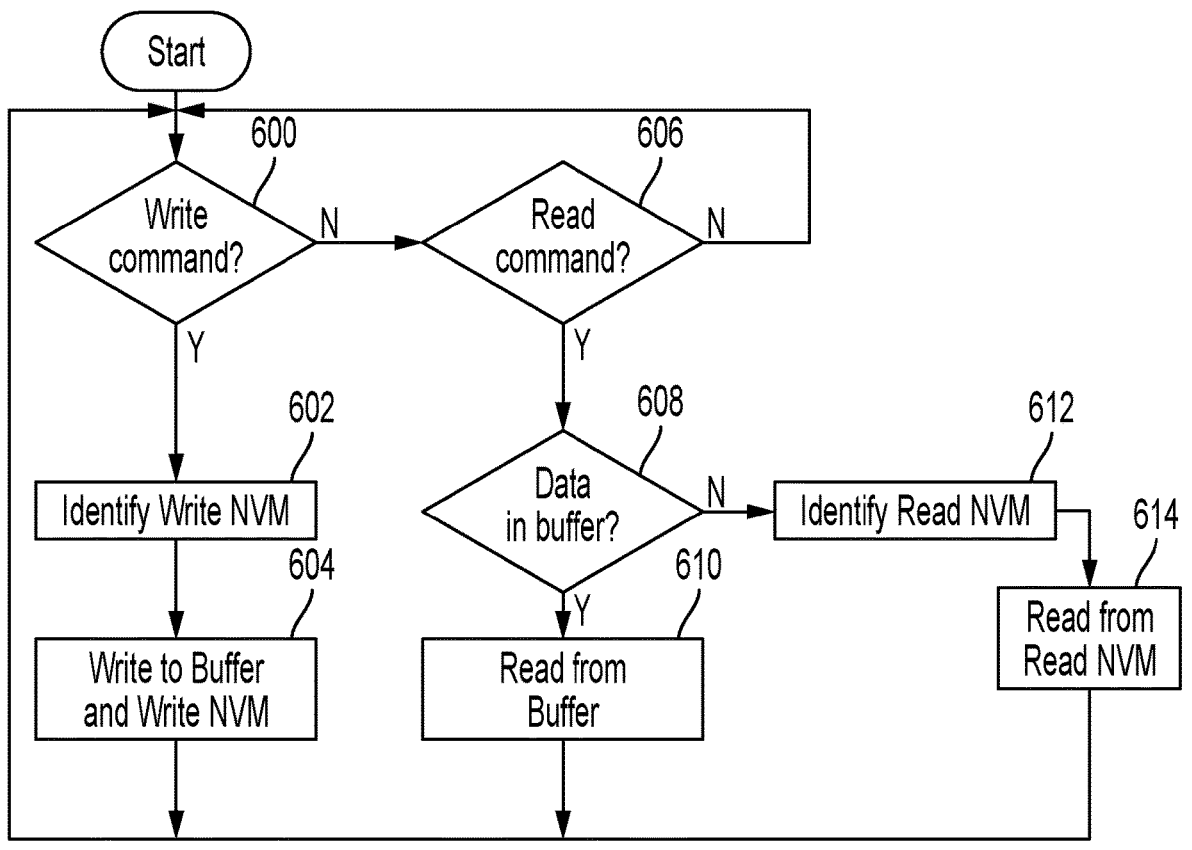
FIG. 6 depicts a flow diagram of a process for processing a memory access request according to one or more embodiments.

FIG. 6 depicts a flow diagram of a process for processing a memory access request according to one or more embodiments. For purposes of the example of FIG. 6, it is assumed that the request has been processed by the device cache controller 302 and data manager 306, and that a read or write command has been transmitted to the NVM controller 308 upon determining that the memory access request is to be serviced by an NVM 204.

The process starts, and the NVM controller 308 determines, in act 600, whether it has received a write command. The write command may be a result of evicting data from the storage memory 202 to make space for new data to be written by the host. The data to be written to the NVM may be the evicted data. In some embodiments, the new data is written to the NVM in addition to being saved in the storage memory 202. In this embodiment, a second write command may be generated for the new data to be written by the host.

If the NVM controller 308 has received a write command, the NVM controller 308 identifies, in act 602, an NVM (e.g., NVM 204a) that has been set to the write operation mode. The NVM may be identified based on the operation bits 400 set by the command mode generator 314.

In act 604, the command submission controller 310 submits a write command (e.g., an NVMe write command) to the interface (e.g., interface 312a) associated with the identified write NVM (e.g., NVM 204a). The write NVM retrieves the write command from the interface and proceeds to write the data associated with the command in a memory location of the write NVM. A copy of the data is also stored in the buffer 316.

Referring again to act 600, if the command is not a write command, a determination is made, in act 606, as to whether the command is a read command. If the answer is YES, a determination is made as to whether the requested data is in the buffer 316. If the answer is YES, the data is retrieved from the buffer in act 610, and stored in the storage memory 202 and returned to the host 100.

If the data is not located in the buffer, the NVM controller 308 identifies, in act 612, an NVM (e.g., NVM 204b) that has been set to the read operation mode. The NVM may be identified based on the operation bits 400 set by the command mode generator 314.

In act 614, the command submission controller 310 submits a read command (e.g., an NVMe read command) to the interface (e.g., interface 312b) associated with the identified write NVM (e.g., NVM 204b). The read NVM retrieves the read command from the interface and proceeds to retrieve the data associated with the command from a memory location of the read NVM. The retrieved data is stored in the storage memory 202 and returned to the host 100.

Figure 7:
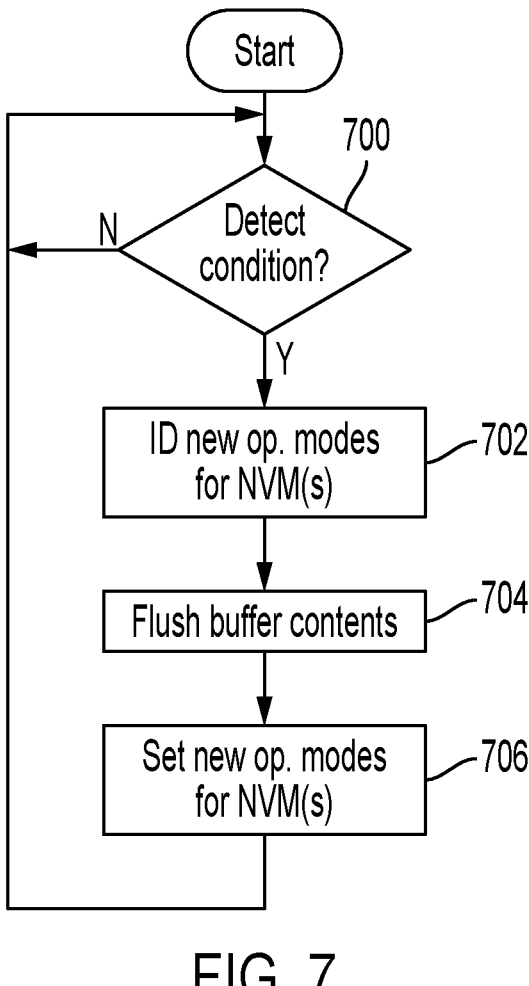
FIG. 7 depicts a flow diagram of a process for setting operation modes of one or more NVMs according to one or more embodiments.

FIG. 7 depicts a flow diagram of a process for setting operation modes of one or more NVMs 204 according to one or more embodiments. The process starts, and in act 700, the command mode generator 314 detects a condition for setting the operation mode of one or more NVMs 204. The condition may be identified in a policy followed by the command mode generator 314 to set the operation modes. The condition may be, for example, expiration of a time period, detection of a threshold fullness of the buffer 316, loss of power, restoring of power, a command from the host, and/or the like.

In act 702, the command mode generator 314 identifies the new operation modes to which the one or more NVMs are to switch. In some embodiments an NVM in the read operation mode switches to the write operation mode, and an NVM in the write operation mode switches to the read operation mode. In some embodiments, such as during power-on, power loss, or the like, all or at least some of the NVMs switch to the same operation mode (e.g., all in the read operation mode or in the write operation mode).

In act 704, the write data collected in the buffer 316 is flushed to one or more NVMs that transition from the read operation mode to the write operation mode. The data may be flushed to a set flush level. Data in the buffer 316 may also be marked to indicate the NVMs 204 to which they have been written. The data that is written to all the NVMs 204 may be freed to make room for new write data.

In act 704, the command mode generator 314 sets the operation bits 400 of the one or more NMVs to reflect the transitioned operation modes.

As a person of skill in the art should appreciate, the various embodiments of the present disclosure allow predictable performance of the applications even under mixed read and write workloads. The separating of read workloads from write workloads and the dedication of one or more NVMs to handle each workload separately enhances performance of the read operations in a cost-efficient manner.

One or more embodiments of the present disclosure may be implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for managing memory devices have been specifically described and illustrated herein, many modifications and variations will be apparent to those skilled in the art. Accordingly, it is to be understood that systems and methods for managing memory devices constructed according to principles of this disclosure may be embodied other than as specifically described herein. The disclosure is also defined in the following claims, and equivalents thereof.

The systems and methods for processing storage transactions may contain one or more combination of features set forth in the below statements.

Statement 1: A device comprising: a controller; a first non-volatile memory (NVM) device; and a second NVM device, wherein the controller is configured to: detect a first condition; set, based on the first condition, the first NVM device for operating in a first operation mode and the second NVM device for operating in a second operation mode; receive a request from a computing device; and select one of the first NVM device or the second NVM device based on the request being respectively one of a first type or a second type, wherein the first NVM device is configured take a first action according to the first operation mode, and the second NVM device is configured take a second action according to the second operation mode.

Statement 2. The device of Statement 1, wherein the first condition includes at least one of expiration of a time period, loss of power, or a command from the computing device.

Statement 3. The device of Statement 1, wherein the first type includes a write request and the second type includes a read request.

Statement 4. The device of Statement 1 further comprising a first memory device and a second memory device, wherein the controller is further configured to: determine that the request is for writing first data; and based on the request: identify second data in the first memory device; determine that the first NVM device is set to a write operation mode; write the second data to the second memory device and to the first NVM device; and store the first data in the first memory device.

Statement 5. The device of Statement 4, wherein the controller is further configured to: receive a second request to read the first data; and based on the second request: generate a first command to retrieve the first data from the first memory device and detect a first result; based on the first result, generate a second command to retrieve the first data from the second memory device and detect a second result; determine that the second NVM device is set to a read operation mode; and based on the second result, generate a command to the second NVM device to retrieve the first data.

Statement 6. The device of Statement 4, wherein the controller is further configured to: detect a second condition; based on detecting the second condition, the controller is further configured to: determine that the second NVM device is set to a read operation mode; based on the second NVM device being set to the read operation mode, store the second data in the second memory device to the second NVM device; and set the first NVM device to the read operation mode and the second NVM device to the write operation mode.

Statement 7. The device of Statement 1 further comprising a memory device, wherein the controller is further configured to: detect a second condition; based on detecting the second condition, the controller is further configured to: set the first NVM device and the second NVM device to operate in the first operation mode.

Statement 8. The device of Statement 7, wherein the second condition includes loss of power to the device, and the first operation mode includes a write mode, wherein the controller is further configured to: read first data and second data stored in the memory device; and store the first data into the first NVM device and the second data into the second NVM device.

Statement 9. The device of Statement 7, wherein the second condition includes detecting power to the device, and the first operation mode includes a read mode, wherein the controller is further configured to: identify first data in the first NVM device and second data in the second NVM device; read the first data and the second data from respectively the first NVM device and the second NVM device; and store the first data and the second data in the memory device.

Statement 10. The device of Statement 1, wherein the controller being configured to set the first NVM device for operating in a first operation mode and the second NVM device for operating in a second operation mode further includes the controller being configured to: set in a memory a first value for the first NVM device for identifying the first operation mode, and a second value for the second NVM device for identifying the second operation mode.

Statement 11. A method comprising: detecting, by a controller of a storage device, a first condition; setting, by the controller, based on the first condition, a first non-volatile memory (NVM) device for operating in a first operation mode and a second NVM device for operating in a second operation mode; receiving, by the controller, a request from a computing device; and selecting one of the first NVM device or the second NVM device based on the request being respectively one of a first type or a second type, wherein the first NVM device is configured take a first action according to the first operation mode, and the second NVM device is configured take a second action according to the second operation mode.

Statement 12. The method of Statement 11, wherein the first condition includes at least one of expiration of a time period, loss of power, or a command from the computing device.

Statement 13. The method of Statement 11, wherein the first type includes a write request and the second type includes a read request.

Statement 14. The method of Statement 11 further comprising: determining, by the controller, that the request is for writing first data; and based on the request: identifying, by the controller, second data in a first memory device; determining, by the controller, that the first NVM device is set to a write operation mode; writing, by the controller, the second data to a second memory device and to the first NVM device; and storing, by the controller, the first data in the first memory device.

Statement 15. The method of Statement 14 further comprising: receiving, by the controller, a second request to read the first data; and based on the second request: generating, by the controller, a first command to retrieve the first data from the first memory device and detect a first result; based on the first result, generating, by the controller, a second command to retrieve the first data from the second memory device and detecting a second result; determining that the second NVM device is set to a read operation mode; and based on the second result, generating a command to the second NVM device to retrieve the first data.

Statement 16. The method of Statement 14 further comprising: detecting, by the controller, a second condition; based on detecting the second condition: determining, by the controller, that the second NVM device is set to a read operation mode; based on the second NVM device being set to the read operation mode, storing, by the controller, the second data in the second memory device to the second NVM device; and setting the first NVM device to the read operation mode and the second NVM device to the write operation mode.

Statement 17. The method of Statement 11 further comprising: detecting a second condition; based on detecting the second condition: setting. by the controller, the first NVM device and the second NVM device to operate in the first operation mode.

Statement 18. The method of Statement 17, wherein the second condition includes loss of power to the device, and the first operation mode includes a write mode, wherein the method further comprises: reading first data and second data stored in a memory device; and storing the first data into the first NVM device and the second data into the second NVM device.

Statement 19. The method of Statement 17, wherein the second condition includes detecting power to the device, and the first operation mode includes a read mode, wherein the method further comprises: identifying first data in the first NVM device and second data in the second NVM device; reading the first data and the second data from respectively the first NVM device and the second NVM device; and storing the first data and the second data in a memory device.

Statement 20. The method of Statement 11, wherein the setting of the first NVM device for operating in a first operation mode and the setting of the second NVM device for operating in a second operation mode further includes: setting in a memory a first value for the first NVM device for identifying the first operation mode, and a second value for the second NVM device for identifying the second operation mode.

What is claimed is:

1. A device comprising:
   a controller;
   a first non-volatile memory (NVM) device;
   a second NVM device;
   a cache memory; and
   a buffer memory configured to store at least a portion of data stored in the first NVM device,
   wherein the controller is configured to:
   detect a first condition, wherein the first condition includes a threshold fullness of the buffer memory;
   set, based on the first condition, the first NVM device for operating in a write operation mode and the second NVM device for operating in a read operation mode;
   receive a write request from a computing device for writing data into a memory address;
   select the first NVM device based on the first NVM device being set in the write operation mode;
   store the data in the first NVM device and in the buffer memory based on the write request;
   receive a read request from a computing device for the data;
   determine presence of the data in the cache memory, and generate a result;
   based on the result, generate a read command for the data; and
   based on the read command:
   determine that the data is stored in the buffer memory; and
   retrieve the data from the buffer memory into the cache memory.

2. The device of claim 1, wherein the first condition includes at least one of expiration of a time period, loss of power, or a command from the computing device.

3. The device of claim 1, wherein the controller is further configured to:
   detect a second condition;
   store second data in the buffer memory to the second NVM device; and
   set the first NVM device to the read operation mode and the second NVM device to the write operation mode.

4. The device of claim 1, wherein the controller is further configured to:
   detect a second condition;
   based on detecting the second condition, the controller is further configured to:

set the first NVM device and the second NVM device to operate in the first write operation mode.

5. The device of claim 4, wherein the second condition includes loss of power to the device, wherein the controller is further configured to:

read first data and second data stored in the cache memory device; and store the first data into the first NVM device and the second data into the second NVM device.

6. The device of claim 4, wherein the second condition includes detecting power to the device, wherein the controller is further configured to:

identify first data in the first NVM device and second data in the second NVM device;

read the first data and the second data from respectively the first NVM device and the second NVM device; and store the first data and the second data in the cache memory.

7. The device of claim 1, wherein the controller being configured to set the first NVM device for operating in a first operation mode and the second NVM device for operating in a second operation mode further includes the controller being configured to:

set in a memory a first value for the first NVM device for identifying the first operation mode, and a second value for the second NVM device for identifying the second operation mode.

8. A method comprising:

detecting, by a controller of a storage device, a first condition, wherein the first condition includes a threshold fullness of a buffer memory storing at least a portion of data stored in a first non-volatile memory (NVM) device;

setting, by the controller, based on the first condition, the first NVM device for operating in a first operation mode and a second NVM device for operating in a read operation mode;

receiving, by the controller, a write request from a computing device for writing data into a memory address;

selecting, by the controller, the first NVM device based on the first NVM device being set in the write operation mode;

storing, by the controller, the data in the first NVM device and in the buffer memory based on the write request;

receiving, by the controller, a read request from a computing device for the data;

determining, by the controller, presence of the data in a cache memory, and generating a result;

based on the result, generating a read command for the data; and based on the read command:

determining that the data is stored in the buffer memory; and retrieving the data from the buffer memory into the cache memory.

9. The method of claim 8, wherein the first condition includes at least one of expiration of a time period, loss of power, or a command from the computing device.

10. The method of claim 8 further comprising:

detecting, by the controller, a second condition;

storing, by the controller, second data in the buffer memory to the second NVM device; and setting the first NVM device to the read operation mode and the second NVM device to the write operation mode.

11. The method of claim 8 further comprising:

detecting a second condition;

based on detecting the second condition:

setting, by the controller, the first NVM device and the second NVM device to operate in the write operation mode.

12. The method of claim 11, wherein the second condition includes loss of power to the device, wherein the method further comprises:

reading first data and second data stored in the cache memory device; and storing the first data into the first NVM device and the second data into the second NVM device.

13. The method of claim 11, wherein the second condition includes detecting power to the device, wherein the method further comprises:

identifying first data in the first NVM device and second data in the second NVM device;

reading the first data and the second data from respectively the first NVM device and the second NVM device; and storing the first data and the second data in the cache memory.

14. The method of claim 8, wherein the setting of the first NVM device for operating in a first operation mode and the setting of the second NVM device for operating in a second operation mode further includes:

setting in a memory a first value for the first NVM device for identifying the first operation mode, and a second value for the second NVM device for identifying the second operation mode.

* * * * *